United States Patent
Temtchenko et al.

[11] Patent Number: 6,040,414
[45] Date of Patent: *Mar. 21, 2000

[54] COATINGS FOR COILS

[75] Inventors: Tatiana Temtchenko, Alessandria; Massimo Malavasi, Milan, both of Italy

[73] Assignee: Ausimont S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,502

[22] Filed: Jun. 10, 1997

[30] Foreign Application Priority Data

Apr. 17, 1997 [IT] Italy .................................. MI96A1177

[51] Int. Cl.$^7$ .................................................. C08G 18/50
[52] U.S. Cl. ........................... 528/70; 528/45; 427/388.1; 427/388.2; 427/388.3; 428/425.8
[58] Field of Search .................... 528/70, 45; 427/388.1, 427/388.3, 388.2; 428/425.8

[56] References Cited

U.S. PATENT DOCUMENTS

| | | | |
|---|---|---|---|
| 2,242,218 | 5/1941 | Auer | 91/70 |
| 3,665,041 | 5/1972 | Sianesi et al. | 260/615 A |
| 3,715,378 | 2/1973 | Sianesi et al. | 260/463 |
| 3,810,874 | 5/1974 | Mitsch et al. | 260/75 |
| 4,314,004 | 2/1982 | Stoneberg | 428/421 |
| 5,026,814 | 6/1991 | Re et al. | 528/61 |
| 5,178,915 | 1/1993 | Moyle et al. | 427/318 |
| 5,366,803 | 11/1994 | Nakazawa et al. | 428/335 |

FOREIGN PATENT DOCUMENTS

| | | |
|---|---|---|
| 0148482 | 7/1985 | European Pat. Off. |
| 0239123 | 9/1987 | European Pat. Off. |
| 0247614 | 12/1987 | European Pat. Off. |
| 551 727 A1 | 7/1993 | European Pat. Off. |
| 622 391 | 11/1994 | European Pat. Off. |
| 665 253 A1 | 8/1995 | European Pat. Off. |
| 0700957 | 3/1996 | European Pat. Off. |

OTHER PUBLICATIONS

Saunders & Fresch; *Polyurethanes*; p. 118–120, 1962.
Italian patent application No. 19779A/86, filed Mar. 17, 1986 (now abandoned).
Italian patent application No. 19780A/86, filed Mar. 17, 1986 (now abandoned).

*Primary Examiner*—Rachel Gorr
*Attorney, Agent, or Firm*—Nikaido Marmelstein Murray & Oram LLP

[57] ABSTRACT

Use of crosslinked polymers for coil coating based on perfluoropolyethereal polymers, comprising as repeating units sequences of one or more oxyfluoroalkylenic units such as $-CF_2CF_2O-$, $-CR_4R_5CF_2CF_2O-$ wherein $R_4$ and $R_5$ equal to or different from each other are chosen among H, Cl, F or perfluoroalkyl from 1 to 4 carbon atoms, $-CF_2CF(CF_3)O-$, $-CFYO-$, wherein Y is equal to F or $CF_3$, having hydroxylic bifunctional termination, crosslinking being carried out with blocked polyisocyanates having at least 3 NCO groups.

17 Claims, 11 Drawing Sheets

COATINGS FOR COILS

FIELD OF THE INVENTION

The present invention relates to compositions for coating metal coils such as steel, aluminum, anodized aluminium and metal drawn products.

BACKGROUND OF THE INVENTION

The pre-painting of metal semimanufactured products is a well-known technology. Metals, for instance, steel and aluminium, are manufactured in continuous foils coiled in rollers, said coils, being pre-painted before the successive out and forming in obtain manufactured articles for the automotive industry, architectural, household appliances, etc.

The metal sheets before painting are generally subjected to washing operations, the so called pre-treatment phase, to clean the surface. The varnish is layed onto the coil by rollers and usually comprises two or three passages, each of them followed by passing in an oven. The formulations utilized for coating are based on polymers, both curable and non crosslinked.

The industrial coil coating lines are highly productive. They work at high speed, with residence time in the oven lower than one minute (from 15 to 60 seconds). Also in the case of curable coatings, the crosslinking must take place within the above indicated time frame. Therefore, the critical parameter for the film crosslinking is the baking temperature, and more precisely the maximum T reached by the metallic oil, called PMT (peak metal temperature) in the oven. The baking is generally carried out at high temperature, usually chosen in the range of 200–300° C. so as to complete the crosslinking within the indicated short times. At the exit from the oven, the metal sheet is wound in coil. Since the bending stress of the winding exerts very high pressures among the sheets, the polymeric film must be completely cured, i.e. it must have already reached the top of intrinsic mechanical and surface properties. This is needed to avoid apparent surface damages, known in the technology as "metal marking" which might compromise the successive processing steps and deteriorate the aesthetic appearance and the duration of the protective effect.

The coatings usually utilized for coil coating of the prior art are curable polyesters, polyesters modified with silicone resins, acrylic modified silicone resins. In the field of coatings which reach final dimensional stability (by crosslinking or melt solidification) in very short times (coil coating conditions), the use of fluorinated polymers is known too, which, thanks to their outstanding chemical and photooxidation resistance, offer high performances both from the aesthetic stand point and protective function for an extended (often more than 20 years) period of time.

In U.S. Pat. No. 4,314,004 (PPG) the use of formulations for coil coating based on mixtures of PVDF (polyvinylidenefluoride) and acrylic resins is described. The painting cycle there described is: metal pretreatment/primer/pigmented coat—by utilizing a PVDF composition (45–85% by weight) and acrylic resin (15–55% by weight)—/clear top coat with non pigmented resin based on PVDF (45–85% by weight) and acrylic resin (15–55%) by weight.

The acrylic resin secures the intercoat adhesion. The obtained films have high chemical and weather resistance (4300 h QUV test, delta E=1.0 and delta gloss retention>80%).

Due to the PVDF intrinsic characteristics (semicrystalline) the gloss of the PVDF-acrylic coating, measured at 60°, does not exceed values of about 40.

To obtain higher gloss, the use of other fluorinated polymers is indicated in the prior art. For instance U.S. Pat. No. 5,178,915 (Morton) describes the use of transparent formulations, for the application on anodized metal and for coil coatings, containing resins such as LUMIFLON®, CEFRAL®, i.e. polymers obtained by polymerization of chlorotrifluoroethylene (CTFE) with hydrogenated vinylethers or vinylesters, crosslinked for instance with blocked isocyanates and/or melamines and formulated with various kinds of additives (UV-adsorber, antifoaming, stretching agents, antiscratch, etc.) to improve the final properties of the film. The crosslinked fluorinated resins offer, besides higher values of gloss (at 60°, values of about 80) also good bending resistance (T bend=2T), remarkable chemical and ageing-resistance, i.e. performances not far from those of PVDF. The performace similarity and complementarity have been shown in U.S. Pat. No. 5,366,803 (Mitsubishi). Indeed transparent and pigmented formulations containing LUMIFLON® resins, crosslinked with melamines and applied onto PVDF coated coils are described therein. The crosslinked films have high gloss (in the range of 80), and UV resistance (2000 hours QUV test).

The weak points of the coatings utilized in the prior art are represented by the following facts:

poor resistance to the metal marking with consequent deterioration of the optical characteristics of the coating, such as gloss and definition of image (DOI)

poor bending resistance, both of the transparent coating but especially of the pigmented one, which is apparent with the hazing (yield) and in the brittle splitting with consequent loss of film continuity and, therefore, of the protective anticorrosion characteristics very poor characteristics of stain release and of no dirt pick-up.

The coatings of the prior art, on the average, show lack of all these three features. More precisely they can, at most, improve a single performance. However, this is achievable with substantial draw backs affecting the other required fundamental features.

Moreover, and in particular for the last feature listed above, (stain release and no dirt pick-up) the art teaches that this lack affects every kind of coating for whatsoever application technology. Antistatic additives are commonly used. The improvement, however, is lost after a short time of exposure to the environment because of the combined attack of pollutants, environmental aggressive agents and UV exposure.

The fluorinated polymers themselves, notwithstanding the superior characteristics of chemical resistance and the theoretically excellent surface properties of the fluorine, do not offer acceptable performances to satisfy this requirement. Indeed, the fluorinated polymers tend to electrostatically charge themselves and therefore to attract the environmental particulate; moreover the well known fluorocarbon water- and oil-repellent does not automatically mean an equivalent capacity of the stains repellence.

The stains and the dirt are a complex combination of substances of various kind, both of natural and human origin. Among the components we have metals, metal oxides and hydrates, salts, carbon and carbonaceous and organic degraded substances (partially oxidized). The chemical-physical polyvalence of this variable combination of substances makes very difficult whatever attempt of comprehensive systematization and quantified evaluation of the phenomena. There is no consensus opinion on test conditions representative of the real world. This does not modify the apparent fact that the polymeric coatings easily soil. The matter is under the eyes and the attention of everybody, since also an aesthetic function (stain resistance) as well as a protective function of the substrates are required thereto.

To improve the stain release of fluorinated and non fluorinated coatings, in the prior art the use of polyfunctional molecules is indicated. For instance in EP patent 700,957 complex molecules incorporating different combined structures are cited, in particular the combination of silicone polymeric chains with fluorinated polymeric chains, bound to hydrogenated blocks containing various chemical functions (hydroxylic, aminic, carboxylic, polyethoxylic, etc.) These systems show only a partial improvement of the stain release characteristics and, above all are not capable of maintaining the performance during the time.

DETAILED DESCRIPTION OF THE INVENTION

Figure 1:
FIG. 1 shows sample panels prior dirt-pickup tests.

It has been unexpectedly found by the Applicant that by utilizing a fluorinated coating as defined above, it is possible to obtain the combination of the following properties:

high gloss surface continuously tunable gloss, from high values higher than 80 up to values lower than 10 through surface opacifiers high definition of the imagine (DOI)

high chemical and ageing resistance high adhesion to the surface of the metal as such, anodized, or also treated with primer, or to metals already coated with other resins, both hydrogenated and VDF based, for instance PVDF high resistance to the metal bending high metal marking resistance high resistance to the dirt pick-up (no dirt pick-up), antistatic properties, and easy cleaning both with water and detergent-solvent removal of the stain release antigraffiti high interaction with pigments, but maintaining the combination of features indicated above.

It is to be noticed that the above set of performances is provided by the resin of the invention which, by the way, can be formulated and applied at a very high solid content, higher than 80% by weight, even higher than 85%, in pigmented formulation; i.e. it can be defined a solventless paint, according to rules which are foreseen in force both in Europe and in the USA in the near future. Of course, it is an applicable solventless resin because the low solvent content is sufficient to reduce formulation viscosity, down to values tolerated by established coil coating technology.

It is an object of the present invention crosslinked (per) fluoropolyethereal polymers, comprising as repeating units sequences of one or more oxyfluoroalkylenic units such as —$CF_2CF_2O$—, —$CR_4R_5CF_2O$— wherein $R_4$ and $R_5$ equal to or different from each other are chosen among H, Cl, F or perfluoroalkyl from 1 to 4 carbon atoms, —$CF_2CF(CF_3)$ O—, —CFYO—, wherein Y is equal to F or $CF_3$, having hydroxylic bifunctional termination, crosslinking being carried out with blocked polyisocyanates having at least 3 NCO groups.

In particular, the usable perfluoropolyethers generally have a molecular weight average number comprised between 500 and 5000, more preferably comprised between 700 and 2000.

As a sub case, however, to broaden the application field towards higher modulus resin, low molecular weight (MW) fractions, less or equal to 700, of the bifunctional OH terminated fluoropolyether are required.

These low MW fractions are prone to significant loss by evaporation during processing in the oven, particularly at high PMT.

To overcome this limitation, it is preferably to prepolymerize these fractions with isocyanurate trimers having free NCO, the prepolymerization being carried out at low conversion degress so as to leave free hydroxylic groups, and then blocking the remaining NCO function, for example with methyl ethyl ketoxime.

Preferably the (per)fluoropolyethers comprise as repeating units sequences belonging to the following classes:

a) —$(CF_3F_6O)_{m'}(CFYO)_{n'}$— wherein the unit $(C_3F_6O)$ and (CYFO) are perfluorooxyalkylenic units randomly distributed along the chain; m' and n' are integers such as to give the molecular weight indicated above, and m'/n' is comprised between 5 and 40, when n' is different from 0; Y is equal to F or $CF_3$; n' can also be 0;

said units can be linked to each other by a bridge bond —O—R'$_f$—O—, where R'$_f$ has the meaning defined in c) hereunder;

b) —$(C_2F_4O)_{p'}(CFYO)_{q'}(C_3F_6O)_{r'}$— wherein p' and q' are integers such that '/q' ranges between 5 and 0.3, preferably 2.7–0.5, and such that the molecular weight is that indicated above; t' being an integer with the meaning of m', Y=F or $CF_3$; t' can be 0 and q'/q'+p'+t' lower than or equal to 1/10 and the t'/p' ratio is from 0.2 to 6;

c) —$CR_4R_5CF_2CF_2O$— whereien $R_4$ and $R_5$ are equal to or different from each other and chosen from H, Cl, F or perfluoroalkyl, for instance, with 1–4 C atoms, the molecular weight being that indicated above, said units inside the fluoropolyoxyalkylenic chain being linked each other as follows:

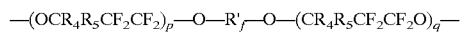

wherein R'$_f$ is a fluoroalkylenic group, for instance from 1 to 4 C, p and q are integers from 0 to 200, and p+q is at least 1 and such that the molecular weight is that indicated above, d) —(CF(CF$_3$)CF$_2$O— said units being linked each other inside the fluoropolyoxyalkylenic chain as follows:

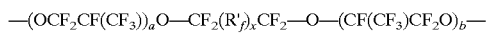
—(OCF$_2$CF(CF$_3$))$_a$O—CF$_2$(R'$_f$)$_x$CF$_2$—O—(CF(CF$_3$)CF$_2$O)$_b$— wherein R'$_f$ has the meaning indicated above, x is 0 or 1, a and b are integers and a+b is at least 1 and such that the molecular weight is that indicated above, e) —(C$_2$F$_4$O)$_{a'}$(CFYO)$_{b'}$— wherein a' and b' are integers such that the molecular weight is within the range indicated, a'/b' ranges between 5 and 0.3, preferably between 4.5 and 0.5, Y has the meaning indicated above.

The mentioned fluoropolyethers are obtainable with the processes well known in the art, for instance the U.S. Pat. No. 3,665,041, 2,242,218, 3,715,378, and European patent EP 0239123. The functionalized fluoropolyethers with hydroxylic termination are obtained for instance according to patents EP 0148482, U.S. Pat. No. 3,810,74.

The preferred compounds are those of the class e) having the general formula

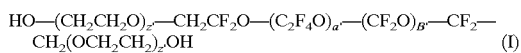
HO—(CH$_2$CH$_2$O)$_{z'}$—CH$_2$CF$_2$O—(C$_2$F$_4$O)$_{a'}$—(CF$_2$O)$_{B'}$—CF$_2$—CH$_2$(OCH$_2$CH$_2$)$_{z'}$OH    (I)

wherein z' is generally comprised between 0 and 20, preferably between 0 and 4. When z' is different from zero then it must be present Z DOL (Z=0) in amounts of at least 1% by moles, preferably 5% by moles.

More preferably z'=0 (Z DOL).

The above mentioned perfluoropolyethereal compounds having an hydroxylic bifunctional termination can also be partially substituted, generally even up to 50% by weight, but preferably 20% by weight, by perfluorocarbons containing units chosen among the following ones: —(CF$_2$CF$_2$)—, —(CF$_2$CFX)— wherein X is a perfluoroalkyl from 1 to 4 carbon atoms, Cl or OR"$_f$ wherein R"$_f$ is a perfluoroalkyl from 1 to 4 carbon atoms.

These difunctional OH compounds can be prepared according to methods well known in the art for instance according to the Italian patent applications 19779A/86, 19780A/86, European patent EP 247614, starting from alpha-omega diiodoperfluoroalkanes, for instance I(CF$_2$CF$_2$)$_n$I, wherein n indicates the number of repeating units, to obtain by the processes mentioned therein the —CF$_2$CH$_2$OH, —CF—(CF$_3$)CH$_2$OH terminations.

In practice one telomerises in conditions of radical reaction the perfluoroolefins TFE and/or fluorinated alpha-olefins and/or fluorinated vinylethers, the units of which have been indicated above, with iodine as initiator to obtain α, ω diiodoperfluoroalkylenes. From these precursors with reactions known and described in the literature can be applied, for instance reaction with SO$_3$ and successive hydrolysis to obtain the COOH group and moreover esterification to obtain the corresponding diester, for instance methylic diester —CF$_2$COOCH$_3$, which can be reduced with NaBH$_4$ to the corresponding alcoholic group —CH$_2$OH in alpha to the perfluoroalkylic structure.

An alternative synthesis route consists in dehydroiodination of the —CH$_2$CH$_2$I terminal in basic ambient to —CH=CH$_2$, subsequent oxidative demotion to —COOH and then the above indicated route is followed.

When this class of fluorinated diols is employed, the molecular weight must be clearly lower, preferably about the half with respect to that of the perfluoropolyethers mentioned above. Also the other terminations indicated above for perfluoropolyethers can be obtained by following the methods mentioned in the prior art cited above.

As mentioned above, the crosslinking agents of the present invention belong to the class of blocked polyisocyanates, for instance blocked with ketoximes or caprolactones.

The polyisocyanates containing isocyanurate rings belong for instance to this class. The crosslinking agents are mixed with the perfluoropolyethereal functional polymers together with solvents such as acetates of general formula CH$_3$COOR$_2$, with R$_2$, cycloaliphatic, linear or branched alkylic radical containing from 2 to 6 carbon atoms, or ketones of general formula R$_3$,COR$_4$, with R$_3$, and R$_4$, linear or branched alkylic radicals containing from 1 to 5 carbon atoms, etc. The ratio between crosslinking agent and fluoropolyethereal resin having bifunctional hydroxylic terminals is such that the ratio in equivalents NCO/OH generally ranges between 1/1 and 1.5/1, preferably between 1.05/1 and 1.25/1. If desired, an excess of Z DOL, for example 5–10%, could be used too.

In order to speed up the crosslinking, various types of catalysts, well known in the art, can be added, for instance metallorganic compounds such as dibutyltindilaurate, dibutyltinacetate, dibutyltin oxide, tertiary amines, like triethylamine, or iron complexes like iron acetylacetonate, titanium alcoholates such as titanium tetraisopropylate.

The amount of catalyst ranges from 0.001 to 2% by weight, preferably 0.01–0.5% referred to the total weight.

Also, melamine resins can be utilized as crosslinking agents with ratios by weight comprised between 70:30 and 90:10, preferably 80:20, between polyhydroxylate compounds and melamine. As melaminic resins CYMEL® 303 or 325 (by Cyanamid) can be mentioned.

However, the use of melamines generates a harder polymeric film, i.e. it increases the hardness and scratch resistance performances, at the expense however of the film flexibility, and perhaps film continuity where high geometrical deformation of the support is superimposed (bending). Therefore, they can be usefully added, preferably in combination with the polyisocyanic crosslinking agents indicated above.

To accelerate the crosslinking when melamine is used, acid catalysts can be added such as organic compounds of the sulphonic acid, for instance paratoluensulphonic acid, the amount being that indicated above for the other catalysts. As an alternative to melamines, the mechanical properties can be tuned toward higher hardness, though at the expense of the flexibility, through the addition, mentioned above, of low molecular weight Z DOL prepolymerized with isocyanurate trimers and blocked. The amount of these blocked prepolymers can range from about 5 to 35% by weight. The use of resins with MW range extended to low molecular weights (below 700) is important, for instance, for the coating of rigid metal extrudates, wherein the match hardness-flexibility is in favour of the former performance. Said prepolymers, not only increase the hardness (from HB to F), but for the painting of vertical surfaces (window frame) impart also antisagging characteristics, due to a small but sufficient tixotropic behaviour. These antisagging properties can also be obtained by using other known thixotropic agents, for example, pyrogenic silica, such as Aerosil® and R972, 974 commercialized by Degussa.

The dilution of the formulations of the present invention is preferably such as to obtain a concentration of final solid comprised beetween 75 and 85% by weight. Formulations with these amounts of solid in the solvent are defined as high solid formulations. Said compositions are preferable, since they limit the amounts of solvent released, to be recycled or to be burned.

Generally, the suitable solvents are those widely used in the paint technology, such as ketones, esters of heteroalcohols, aromatics and cycloaliphatics. Methylethylketone, methylisobutylketone, ethyl or butyl acetate, cellosolve acetate, propylenglycolmethylether acetate, xylol, mixtures of aromatic solvents, and cycloaliphatics (Solvesso®), among which cyclopentane and cyclohexane are preferred.

Also solvents of fluorinated type can be utilized, such as for instance perfluorocarbons, optionally containing heteroatoms such as nitrogen or oxygen, or (chloro) hydrofluorocarbons. Perfluoropolyethers with perfluoroalkylic terminals with the repeating units indicated above, or with at least a fluoroalkylic terminal containing an hydrogen atom, preferably bifunctional perfluoropolyethers having the —$OCF_2H$ termination, can also be used.

The conventional additives such as fillers and pigments can be added to the paint. The pigments can be selected from the natural, inorganic synthetic and organic synthetic ones.

As example of inorganic pigments we can mention: metal oxides (titanium dioxide, iron oxides, mixed oxides of Ni, Co, Zn, Ti or Cu, Cr or Fe, Ni, Cr, Mn cobalt aluminates); organic pigments (derivatives of anthraquinone, quinacridone, tetrachloroisoindolidone, diketo-perylene, phthalocyanines, etc.).

The pigments are added in powder form, generally with particle size lower than 10 microns, and in concentrations comprised between 5 and 20% by volume.

Different from the polymers of the prior art, the resins of the present invention show a high interaction with the pigments, thus maintaining and improving the combination of the properties of the clear base as described above. This unprecedent strong interaction is withstressed by the substantial hardening of the pigmented film, and by film continuity (when bending is applied) retention, in comparaison with the clear coating. This represents, of course, a further surprising effect of the present invention.

It allows, also, the pigment milling without the need of polymeric milling aids, normally less resistant to ageing than the fluorinated resin itself and therefore negatively contributing to the overall ageing characteristics of the formulated paint.

Other examples of fillers can be colloidal silica or fluorinated fillers such as polytetrafluoroethylene, TFE/PFP copolymers (hexafluoropropene).

Other additives are for instance: thixotropic agents, acrylic, silicone, polyurethane, polyamidic polymeric dispersants or with a carboxylic or nonionic functionality; spreading, anti-dewetting, antifoaming, additives, etc.; additives to reduce photooxydation: UV adsorber (derivatives of hydroxybenzophenones, hydroxybenzotriazole, etc.) and HALS (hindered amines for instance derivatives of tetramethyl-piperidine, etc.).

The film thickness applied on supports generally ranges between 5 and 30 micron.

The resins, in the formulations of the present invention described herein well adhere to PVDF-acrylic coated surfaces and can therefore be utilized to improve the gloss of PVDF film utilized in coil coating. They fully adhere also to anodized aluminium, leaving the surface appearance unchanged.

The shelf-life of the formulations is longer than 6 months, also at 40–50° C. storing. The adhesion and the mechanical properties of the formulations allow the forming of handmade articles without delamination from the support, and without cracking as well.

The adhesion to the supports, i.e. the intercoating adhesion between the primer and the top-coat of the present invention is excellent when in the formulation of the primer are contained:

reactive groups, preferably with the OH but also with the NCO of the top-coat, chemically bound to the backbone of the base resin of the primer;

reactive groups, always towards the OH and NCO as above, present in the formulation as additives and/or crosslinking agents of the primer, (for instance melamine, isocyanates, blocked isocyanates, etc.).

When the formulation of the primer is poor of these reactive groups and the features thereof cannot be changed even with addition of foreign components (carriers of these groups) in large amount, it has been found that small additions to the primer of a fluorinated prepolymer, described hereinunder, allows optimal intercoating adhesion.

The prepolymer concerned is represented by the following structures:

(II) the polyether (I), as preferred, with z' different from zero, prereacted with monomeric melamine (ex. Cymel 303).

(III) the polyether (I), as preferred, with z'=0, prereacted with polyisocyanates, already previously described.

The capping reaction techniques of the fluorinated dihydroxyl with hardeners having reactive functions, are performable according to the prior art.

It has been surprisingly found that it is just sufficient to add small amounts of reactive functions to the primer, provided that they are prereacted with the fluorinated polymer and therefore in the form of prepolymer, generally between 0.01 and 10% by weight, preferably between 0.1 and 5% by weight, to obtain very good intercoat adhesion between primer and fluorinated top-coat of the present invention.

As previously said, the coatings of the present invention have optimal mechanical characteristics and allow the forming of coated articles without delamination and without cracking.

The film integrity is maintained also at very high bending values, up to the bending of the laminate on itself with bending radius 0 (T bend=0T). The performance is, surprisingly, almost maintained by the resin charged with pigment up to a content of 20% by weight (T bend=1–2 T), and/or charged with opacifiers such as for instance, silica, generally in the range of 2–4% by weight. The film, both transparent and pigmented, passes the tests of metal marking (see characterization of the coating of the examples). The film, both transparent and pigmented, subjected to the bending stress of the coil winding, maintains its integrity and continuity, i.e. the metal substrate protection against aggressive environments, like marine environment (see characterization of the coatings of the examples at the item salt fog chamber test).

The resin of the present invention success in providing the combination of the performances indicated above. This peculiar combination of application properties is referable to its fundamental intrinsic property, which provides a peculiar combination of high value of elastic modulus and yield stress together with very high elongation at break (about 85%), an order of magnitude higher in respect to the prior art (see the stress-strain diagram in the examples) for the transparent compositions; this is valid for the pigmented ones, though to a lesser extent (about 50%). This unique association results, surprisingly, particularly favoured when the bifunctional fluorinated compound of the present invention (with respect to the prior art) preferably shows the —$CH_2OH$ structure directly linked to a fluorinated carbon, for instance —$CF_2CH_2OH$ or —$CF(CF_3)CH_2OH$. This kind of structure is generically indicated hereinafter as DOL.

The crosslinked resin of the invention, comprising the described fluorinated diol and the described polyisocyanate, shows a stress-strain curve (high modulus and plateau after yield stress) which is normally observable in semicrystalline fluorinated polymers, i.e. with mixed morphology with a set of crystalline lamellae spaced by amorphous phase, such as for instance PVDF. Evidences of structure segregation, probably aggregates of hydrogenated segregated phase, separated by fluoropolymer lamellae as continuous phase, are obtainable, by LLS (laser light scattering: see graph in the examples) only of solutions (apparently clear) with DOL only, mixed with hydrogenated solvents and hardeners. It is not excluded that in the transition from solution to crosslinked film there is retention (memory), even only partial, of the structuration in solution, even if this reasonable hypothesis is not limitative of the invention, i.e. of the peculiar combination of mechanical and application properties.

The resin, in the formulations indicated herein, of the present invention unexpectedly shows a remarkable resistance when exposed to environmental aggressives, such as salts, acids and ultraviolet light.

Panels painted with the transparent formulation, subjected to accelerated ageing test (QUV test), show an almost total retention of the original gloss (higher than 80%) after 4000 hours exposition. Also the formulations filled with the 20% by weight of pigment, for instance titanium oxide, (known in the art as strong enhancer of catalytic photodegradation the photocatalytic activity which of the resins). The QUV B test shows an exceptional gloss retention and delta E (see characterization of the coatings in the examples), indicative of very good protection of the pigment integrity.

The resin, in the formulations indicated herein, of the present invention, shows stain release and no dirt pick-up properties never reached, before now, by any polymeric coating, fluorinated and not, of the prior art. Although there is not a consensus opinion on the criteria and test methodologies to assess and quantify this performance, some lab and infield artificial accelerated methodologies have been developed. The coatings can be treated with mixtures representatives of major components present in the dirt. The coatings subjected to these tests are visually evaluated, i.e. without a reference univocal numerical scale, but with well perceivable and apparent qualitative differences (see photos hereinafter).

The superiority of the coating performance of the present invention is already apparent since the beginning just after application, and it is maintained also for samples subjected to accelerated ageing (QUV).

Basic studies carried out by the Applicant on degradative phenomena (UV assisted degradation) prolonged up to the deep demolition of the units characteristic of the resins of the present invention, clearly evidenced the absolute photochemcial stability of the building block DOL (see the graph in the examples).

On the other hand, the chemical function OH, on a methylene carbon, ($CH_2$) which has in alpha a $CF_2$ of the fluorinated building block, has a particularly "acidic" H. The $HOCH_2CF_2$— function coordinates $H_2O$ molecules, and the conditions of rain water (pH=5) are sufficient to break ester bonds and coordinating bonds with degraded organics, or to weaken bonds with metals, metal oxides and cations. In other words, the $HOCH_2CF_2$— function has not only the characteristics known in the art of the —OH functions bound to various hydrogenated carbon structures (antistatic properties, oilrepellency, etc.), but it has other peculiar release properties of the degraded organic and inorganic substances by simple contact with water, and of resistance almost unlimited resistance (referred to the useful life of the manufactured article) to the degradation ve phenomena.

The combination of peculiar characteristics of the present invention, in particular stain release, according to an interpretation, however not binding, could be due to the presence of the hydroxylic fluorinate having termination —$CFYCH_2OH$ wherein Y=F or $CF_3$, indicated hereinafter by —$CF_2CH_2OH$ (see the tables in the examples). The presence of OH functions of the fluorinated compound at the interphase surface with air is reasonably deducible through data obtained, for instance, by XPS techniques (see the graphs in the examples).

Analytical techniques, such as XPS, which give the concentration profile of F, C, O, N in the bulk and in the first layer of about 10–15Å, show a significant compositions variation, particularly meaningful for the decrease of nitrogen at the surface, clearly under the stoichiometry, and at the same time a fluorine increase at the surface with respect to the bulk.

The OH of the fluorinated compound are also inferable by surface electric resistance measurements. These values are 2–3 order of magnitude lower than the values known for hydrogenated polyurethanes (PU) for example. These data could be explained by the presence of OH at the surface. The mentioned measurements seem to confirm the presence of free OH at the surface. However this interpretation is not limitative of the combination of the properties obtained with the compositions of the present invention. Other indirect evidence comes from dynamic contact angle measurements by immersion in water, where rather than the absolute value of the angle, always affected by interferences of surface impurities, an unusual effect of progressive "surface wetting" is noticed.

The initial contact angle value is progressively decreased by passing from a value of around 117 to a value of around 109. The initial and final values of course depend on the compositions. However the above decrease of the contact angle is always detectable.

The presence of free $HOCH_2CF_2$— functions at the surface only, in contrast with the the absence of the film in the bulk (see the IR spectra of the whole thickness of the film in the examples) justified by the excess of hardener with respect to the stoichiometry (essential to obtain the good mechanical characteristics described above), can be partly justified by setting the already expressed hypothesis, though not binding to explain the results of the present invention, of the DOL tendency to be structured in lamellae preferably at the interphase with air. The hypothesis so formulated of peculiar behaviour of the bulding block DOL of the present invention is however not limitative with respect to the analytical evidences (free OH on the surface) an with respect to the performance evidences described so far, object of the invention. Moreover, a degradation beginning due to ageing of the resin of the present invention should increase the concentration of the free OH at the surface and therefore justify the retention during the time of the antistatic stain release and no dirt pick-up characteristics of the coating surface (permanent properties). These properties, in fact, are fully retained by specimens exposed to more than 600 hrs of QUV, by far sufficient to degrade whatever ionic impurity and functional antistatic additive of the art. A further evidence of the present invention consists in that the stain release and no dirt pick-up properties are conferred when the fluorinated diol is linked to the network from one side. The formulations of the present invention can be utilized also as top coat on other resins usually employed to obtain protective films for coils. If the intercoat adhesion is insufficient, the prepolymers (II) and (III) indicated above allow to obtain good continuity among the polymeric films and absence of delamination. And still the only fluorinated bifunctional component of the present invention can be utilized as additive of conventional resins for coils, provided that the resins contain groups capable of reacting with only one OH group of the fluorinated diol of the present invention. Acrylic, acrilic-silicone, silicone, alkydic, epoxydic, polyester (for instance polycaprolactones), phenolic resins, fluorinated, such as for instance PVDF, PVDF-acrilic, LUMIFLON and CEFRAL indicated above etc., can be mentioned. The amount of the hydroxylic fluorinated component as additive reacted as said above, utilized in these cases as additive is generally comprised between 0.1 and 20%, preferably 0.5 and 5% by weight, with respect to the dry. The addition of the formulations of the present invention and of the fluorinated hydroxylic component only in the hydrogenated or fluorinated resins of the prior art containing reactive groups with the OH of the fluorinated diol as indicated above, confers stain-release and no dirt pick-up properties to the conventional resins for coils. If in the known coil resins, the capability of binding (through an OH) the fluorinated diol of the invention to the network is insufficient, the above mentioned prepolymers II and III allow to overcome this deficiency. Optionally, to increase the compatibility of the fluorinated diol of the invention with the conventional coil resins, compatible-making agents and/or dispersants, such as polyalkyleneoxides, polyglycols, etc., for instance linked to a fluorinated chain, can be added. The solvents for preparing these mixtures are those indicated above.

The following examples are given only for illustrative purposes and are not limitative of the scope of present invention.

EXAMPLE 1

Preparation of the Pigmented Composition

A composition containing 37.2 parts (by weight) of fluorinated resin ZDOL having an equivalent weight 614, functionality 1.98, 20.1 parts of titanium dioxide R960 (Du Pont), 36.8 parts of blocked isocyanate VESTANAT B 1358 A, 63% dry in solvesso (Huls), 1.1 parts of catalyst DBTDL (dibutyltin dilaurate ((Fluka), 25% in PMA), 4.8 parts of UV stabilizer mixture TINUVIN 1130/TINUVIN 292 2/1 (Ciba) having 50% by weight in PMA was milled in a laboratory mill Red Devil (Red Devil equipment Co.) for 30 minutes (Hegman finess 6.5). The so obtained pigmented monocomponent formulation was further filtered on three layers of 10,000 meshes Nylon Monodur net.
The solid percentage of the formulation is 83%.

EXAMPLE 2

Application of a Pigmented Composition

The pigmented monocomponent formulation of Example 1 was #30 bar applied on the aluminum panels prepainted with water SALCHI 8044008 having a thickness of about 5 micron, the primer was crosslinked at 280° C. for 30 sec. at PMT=204° C. The fluorinated formulation was crosslinked at 280° C. for 60 seconds at PMT 249° C.

EXAMPLE 3

Preparation of a Transparent Composition

A composition containing 47.2 parts (by weight) of fluorinated resin ZDOL having an equivalent weight 614, functionality 1.98, 46.7 parts of blocked isocyanate VESTANAT B 1358 A, 63% dry in solvesso (Huls), 1.5 parts of catalyst DBTDL (dibutyltin dilaurate ((Fluka), 25% solution in PMA), 4.6 parts of mixture of UV stabilizers TINUVIN 1130/TINUVIN 292 2/1 (Ciba) having 50% by weight in PMA was mixed with mechanical stirrer. The so obtained transparent monocomponent formulation was further filtered on three layers of 10,000 meshes Nylon Monodur net.
The solid percentage of the formulation is 80.7%.

EXAMPLE 4

Application of a Transparent Composition

The transparent monocomponent formulation of Example 3 was #28 bar applied on the aluminum panels prepainted with epoxy primer PPG 273202 crosslinked for 50 sec/280° C. at PMT=232° C., having a thickness of about 5 micron, and layer of PVDF (HYLAR 5000 (Ausimont USA), thickness about 30 micron, crossliked at 280° C. for 55 seconds at PMT 249° C.). The fluorinated monocomponent formulation was crosslinked at 280° C. for 60 seconds at PMT 249° C.

EXAMPLE 5 (COMPARATIVE)

Example 3 was repeated, but by utilizing a known fluorinated resin CEFRAL COAT.

The composition containing 42.8 parts by weight of fluorinated resin CEFRAL COAT A202, 50% dry, 6.4 parts of blocked isocyanate DESMODUR BL 3175 (Bayer, 75% of dry), 47.0 parts of solvesso 150, 1.6 parts of mixture of UV TINUVIN 1130/TINUVIN 292 2/1 stabilizers was mixed with mechanical stirrer. The so obtained transparent monocomponent formulation was further filtered on three layers of 10,000 meshes Nylon Monodur net.
Content in dry of the formulation=27.7%.

EXAMPLE 6 (COMPARATIVE)

Application of the transparent composition CEFRAL COAT.

The monocomponent transparent formulation of Example 5 was #28 bar applied on chromate aluminum panels (Q-panel A1-412) prepainted with epoxy primer and PVDF layer as reported in Example 4 and crosslinked at 280° C. for 60 seconds at PMT 249° C.

EXAMPLE 7 (COMPARATIVE)

(ZDOL+Z Tetraol)

The composition containing 15.15 parts (by weight) of fluorinated resin class ZDOL (z'=0 in formula (I) and —$CF_2$—$CH_2OH$ terminations), having equivalent weight 614, functionality 1.98, 15.15 parts of fluorinated resin Z tetraol (formula (I) with z' different from 0 with the —$CF_2CH_2O$—$CH_2CH(OH)$—$CH_2OH$ terminations at 100% of dry), 12.6 parts of titanium dioxide R690 (Dupont), 44.6 parts of blocked isocyanate Vestanat B 1358 A (Huls) with 63% by weight in solvesso, 0.6 parts of catalyst DBTDL (dibutyltin dilaurate (Fluka), 25% in PMA), 1.2 parts of stabilizers mixture of UV TINUVIN 1130/TINUVIN 292 2/1 (Ciba) at 50% in PMA, 10.7 parts of PMA (propyleneglycol methylether acetate) was milled in laboratory mill Red Devil (Red Devil equipment Co.) for 30 minutes (finess Hegman 6.5).

The so obtained pigmented monocomponent formulation was further filtered on three layers of 10,000 meshes Nylon Monodur net. Content in dry of the formulation=74.8%.

EXAMPLE 8 (COMPARATIVE)

Application of a pigmented composition of Example 7.

The pigmented monocomponent formulation of Example 7 was #30 bar applied on the aluminum panels prepainted with primer as reported in example 2.

EXAMPLE 9 (COMPARATIVE)

The bicomponent formulation containing 45.5 parts by weight of fluorinated resin ZDOL having equivalent weight 614, functionality 1.98, 48.7 parts of adduct of trimethylolpropane and isophorondiisocyanate Polurene MC (Sapici, 60% dry) NCO/OH ratio=1.1/1; 4.5 parts of PMA, 1.2 parts of catalyst DBTDL (dibutyltin dilaurate (Fluka), 25% in PMA) was mixed with mechanical stirrer. The so obtained transparent formulation was further filtered on three layers of 10,000 meshes Nylon Monodur net.

Dry Content of the formulation=75%.

EXAMPLE 10 (COMPARATIVE)

Application of the formulation of Example 9

The bicomponent transparent formulation of Example 9 was #28 bar applied on chromate aluminum panels (Q-panel Al-412) prepainted with epoxy primer and PVDF layer as reported in Example 4 and crosslinked at 280° C. for 60 seconds at PMT 249° C. The crosslinking test carried out according to AICC N 12 standard (rub test MEK) gave negative result as the film has passed only 5 MEK double rubs.

Characterization of the coatings of Examples 2 and 4
The crosslinked films of examples 2, 4, 6, 8 have the following properties:

| | Film ex. 2 | Film ex. 4 | Film ex. 6 | Film ex. 8 |
|---|---|---|---|---|
| Thickness (micron) | 15–20 | 15–20 | 15–20 | 15–20 |
| Adhesion (ASTM D3359-87) % cross cut | 100 | 100 | 100 | 100 |
| Impact test (AICC N 16, Kg × cm) | | | | |
| direct | 50 | 70 | 70 | 30 |
| inverse | 49 | 70 | 70 | 30 |
| T-bend test (AICC N 12) | 0–1T | 0T | 0–1T | >>3T |
| Rub test MEK (AICC N 23) | >100 | >100 | >100 | >100 |
| Gloss (60° C., ASTM D253-85) | 80 | 85 | 80 | 80 |
| $H_2SO_4$ 10% resistance | OK | OK | — | — |
| Salt Fog Test (NCCA II-2) hours | 2000 | 2000 | | |
| QUVB-test (ASTM D253-84, 80% of gloss retention, hrs) | 4000 | 4000 | 2000 | — |
| QUV-test (ASTM D2244-85 color index after 2500 h) (delta E) | 1.1 | 1.2 | 1.7 | — |

Characterization of the coatings of Examples 1 and 3 compared with CEFRAL COAT

Evaluation of blocking resistance and resistance to pressure marking or organic coatings (NCCA II-17)

At least two groups of panels must be tested (4–6 panels in each group) which are subjected to pressure in temperature by means of a suitable device, for a certain period of time. Then the panels involved are cooled and evaluated on the basis of a value scale from 0 to 10 (the process of removal of the panels is evaluated). The panels must be put into contact upper face-lower face.

Suggested standard test conditions:
Temperature: 43–71° C.
Pressure: 21 Kg/sq.cm
Exposure time: 16–24 hrs.
Conditions in which the test was carried out:
Temperature: 70° C.
Pressure: 20 Kg/sq.cm
Exposure time: 24 hrs.
Device: mechanical vice
Expression of the results:
10—the panels are separated without the assistance of the operator at room temperature;
8—the operator can remove the panels with a minimum effort;
6—the operator can remove the panels with average effort;
4—the operator must use great strength to separate the panels;
2—the panels can be separated as in No. 4; remarkable coating transfer from one panel to the other;
0—the panels cannot be separated anyway; complete transfer of the coating from one panel to the other.

The films of Examples 2, 4 and DEFRAL COAT (Ex. 6) have shown after crosslinking the following values of pressure marking and blocking resistance (NCCA II-17):

| | Resistance degree |
|---|---|
| Coating of example 4 | 10 |
| Coating of example 2 | 10 |
| Coating CEFRAL COAT (Ex. 6) | 6 |

EXAMPLE 11

Characterization of the coatings of Examples 2 and 4 compared with other commercial references Evaluation of dirt pick-up The coatings of Examples 2 and 4 compared with other conventional coil coatings applied on the primer of Example 2 were evaluated: PVDF (SALCHI 7110251, crosslinking see Ex. 4) indicated in Figure (PVDF SALCHI); solvent glossy polyurethane paint (SALCHI 6600047 crosslinked at 280° C. for 50 seconds at PMT 241° C., indicated in the figure); solvent semiglossy polyester paint (SALCHI 5560053 crosslinked at 200° C. for 50 seconds at PMT 241° C., indicated in the figure with PE SALCHI).

The dirt pick-up tests were carried out according to two methodologies usually utilized by Central Glass Co., Ltd.:

1. Immersion of the panels in solution containing water, carbon black and iron dioxide under stirring for 24 hours at room temperature, subsequent cleaning of the sheets under water jet, light passage with blotting paper, visual evaluation of the surface state (accelerated test);

2. External exposure of the panels, artificial staining of the samples with the solution containing water, carbon black and iron dioxide, visual evaluation of the surface state after the first rain fall.

The films of Examples 2 and 4 have shown optimal stain release properties which are undoubtedly superior to those of the conventional oil paints (see the attached photos).

Figure 2:
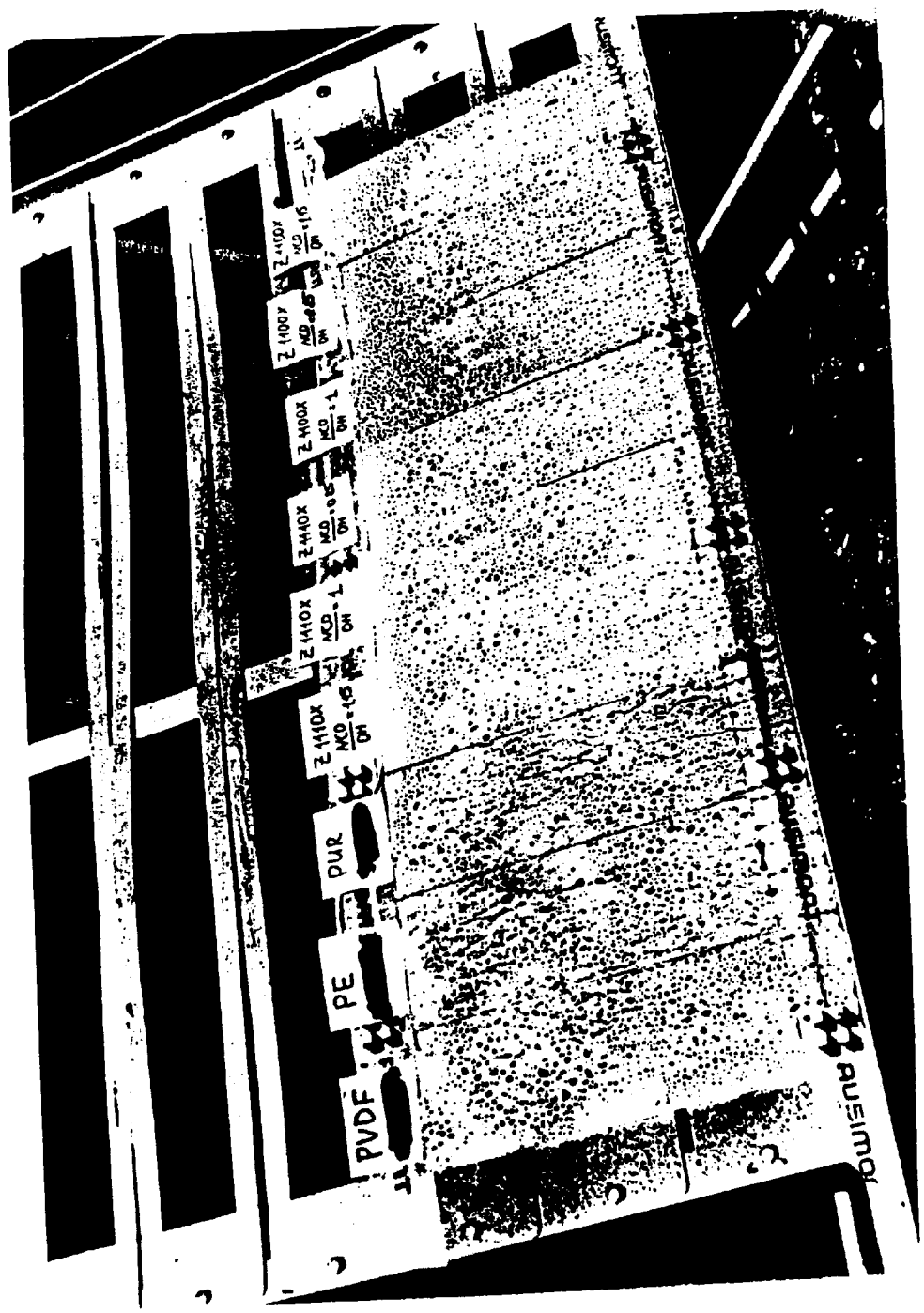
FIG. 2 shows sample panels after dirt-pickup tests.
Figure 3:
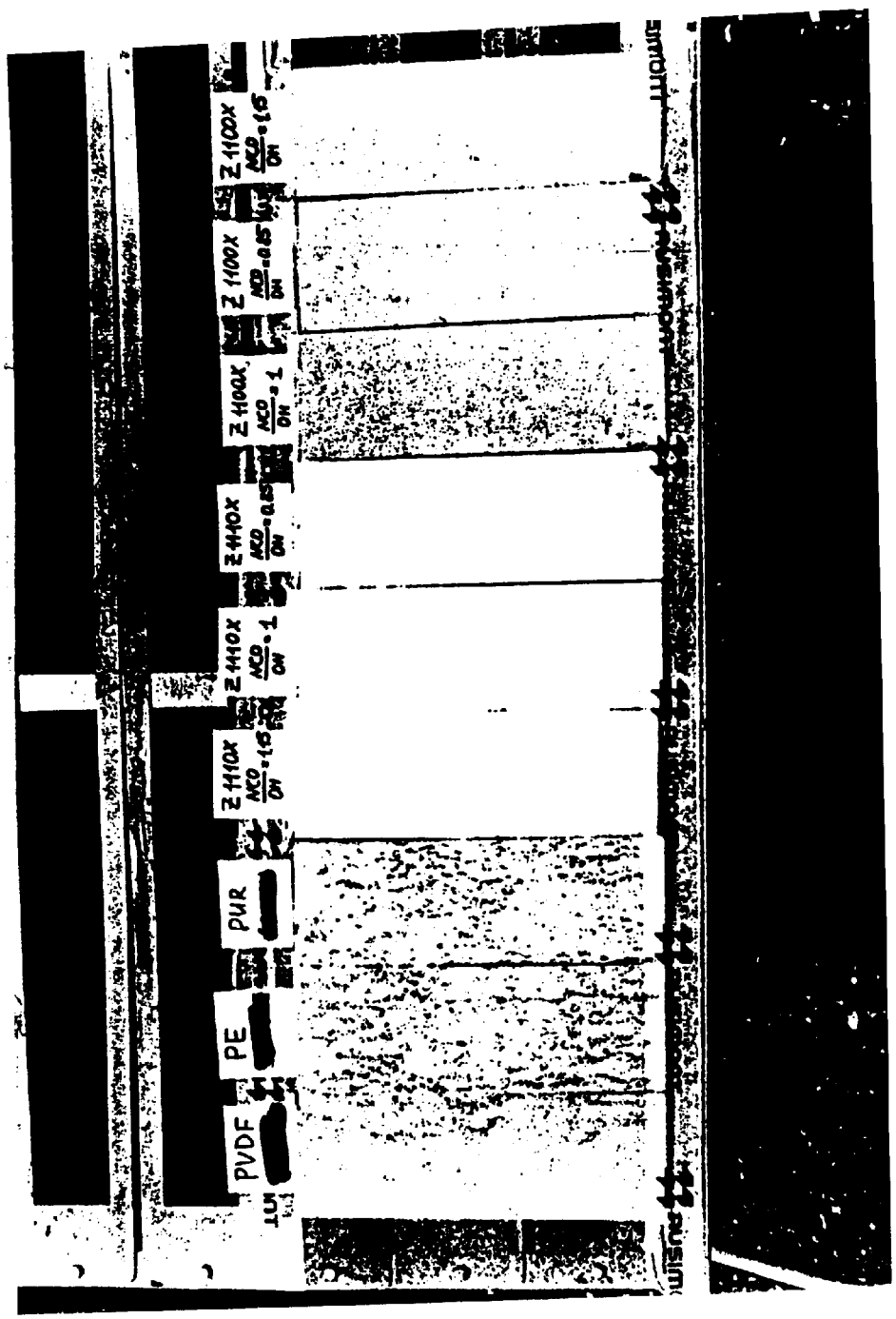
FIG. 3 shows sample panels after the first rainfall
Figure 4:
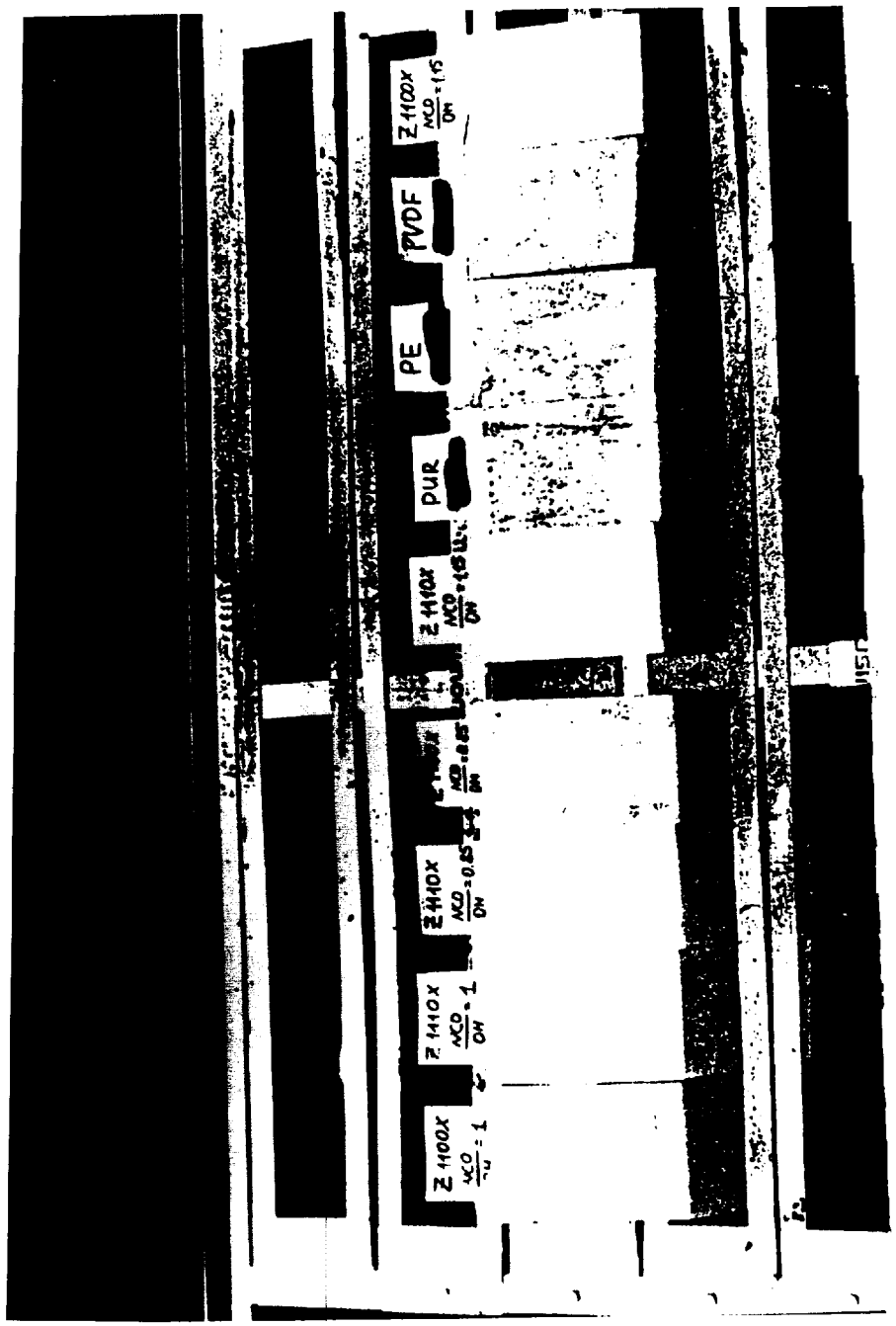
FIG. 4 shows bent samples after a rainfall.

FIG. 1: panels before the dirting treatment;
FIG. 2: panels of FIG. 1 just after dirting with the dirting solution;

FIG. 3: the panels of FIG. 2 after the first rain fall;

FIG. 4: repeats the previous panels of FIGS. 1–3 on bent panels to simulate the roof-wall effect; appearance after the first rain fall.

EXAMPLE 12

Laser light scattering analysis system ZDOL-/ButAc/T-IPDI (trimer IPDI)

The LIS analysis of the system ZDOL-/ButAc/T-IPDI (ButAc means butylacetate, T-IPDI mean strimer of IPDI) was carried out by utilizing as relevant parameters the τ sampling time and the angular scanning of the scattered intensity. The first parameter is referable to the size of the scattering objects, while the second one allows to evaluate the isotropy of the system.

Various solutions were prepared by keeping constant the ButAc/T-IPDI ratio (40/60 by weight, mixture B1358) and by varying the ZDOL content. Scattering objects of different size were observed. The simultaneous analysis in dynamic and in static of each solution allowed to identify, depending on the temperature, the zones in which such objects maintained their isotropy.

Figure 5:
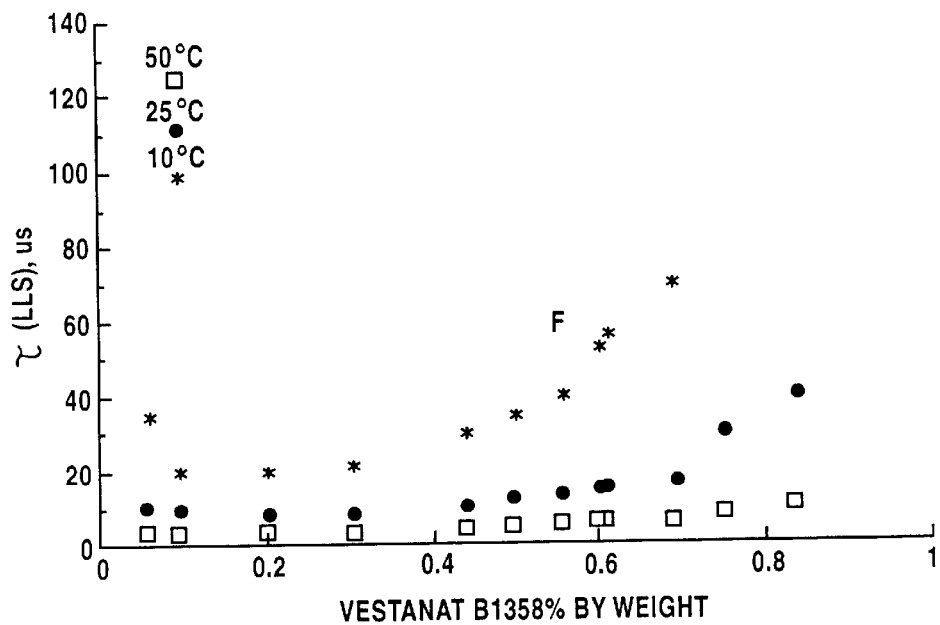
FIG. 5 is a plot of concentration versus weight at various temperatures for the progress of a T sample, over time.

In FIG. 5 the progress of the τ sample time is shown depending on the concentration by weight of commercial blocked B1358 at different temperatures.

Figure 6:
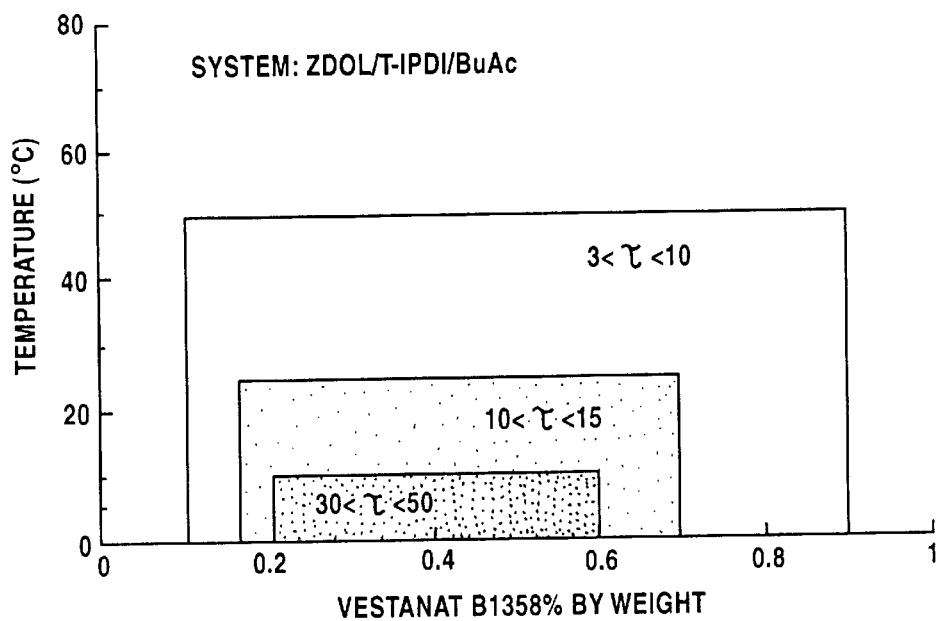
FIG. 6 shows corresponding zones where it was possible to characterize the scattering objects in size and isotropy.

In FIG. 6 are shown the corresponding zones where it was possible to characterize the scattering objects in size and isotropy.

It can be concluded that the compositions useful for the present invention fall within the area where heterophasic fields of hydrogenated components exist, having well identifiable sizes, distinct from the statistic fluctuations of the pure components.

EXAMPLE 13

Figure 7:
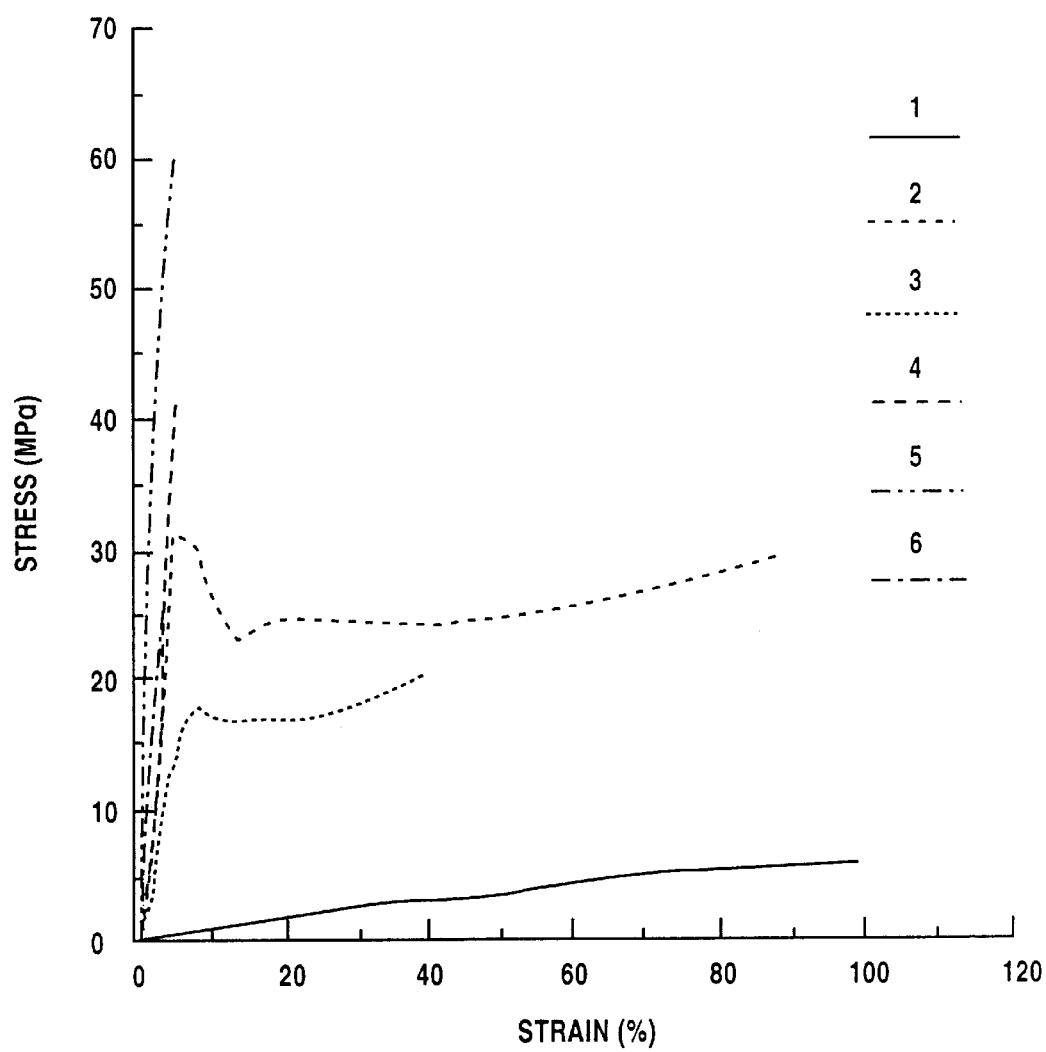
FIG. 7 shows a stress strain diagram of polymeric films of the invention.

In FIG. 7 the Stress-strain diagram of polymeric films of the invention (Numbers 1 and 2), and of comparative films (Numbers 3, 4, 5, 6) is reported.

The numbers have the following meaning:

1) ZDOL+blocked HDI trimer
2) ZDOL+blocked IPDI trimer
3) Tetraol+blocked HDI trimer
4) Tetraol+blocked IPDI trimer
5) Cefral Coat
6) Lumiflon

EXAMPLE 14

In order to be able to have a clearly intelligible representation of the UV degradative processes, it was identified in tetraol the compound representative of the weak points of the crosslinked resins.

Figure 8:
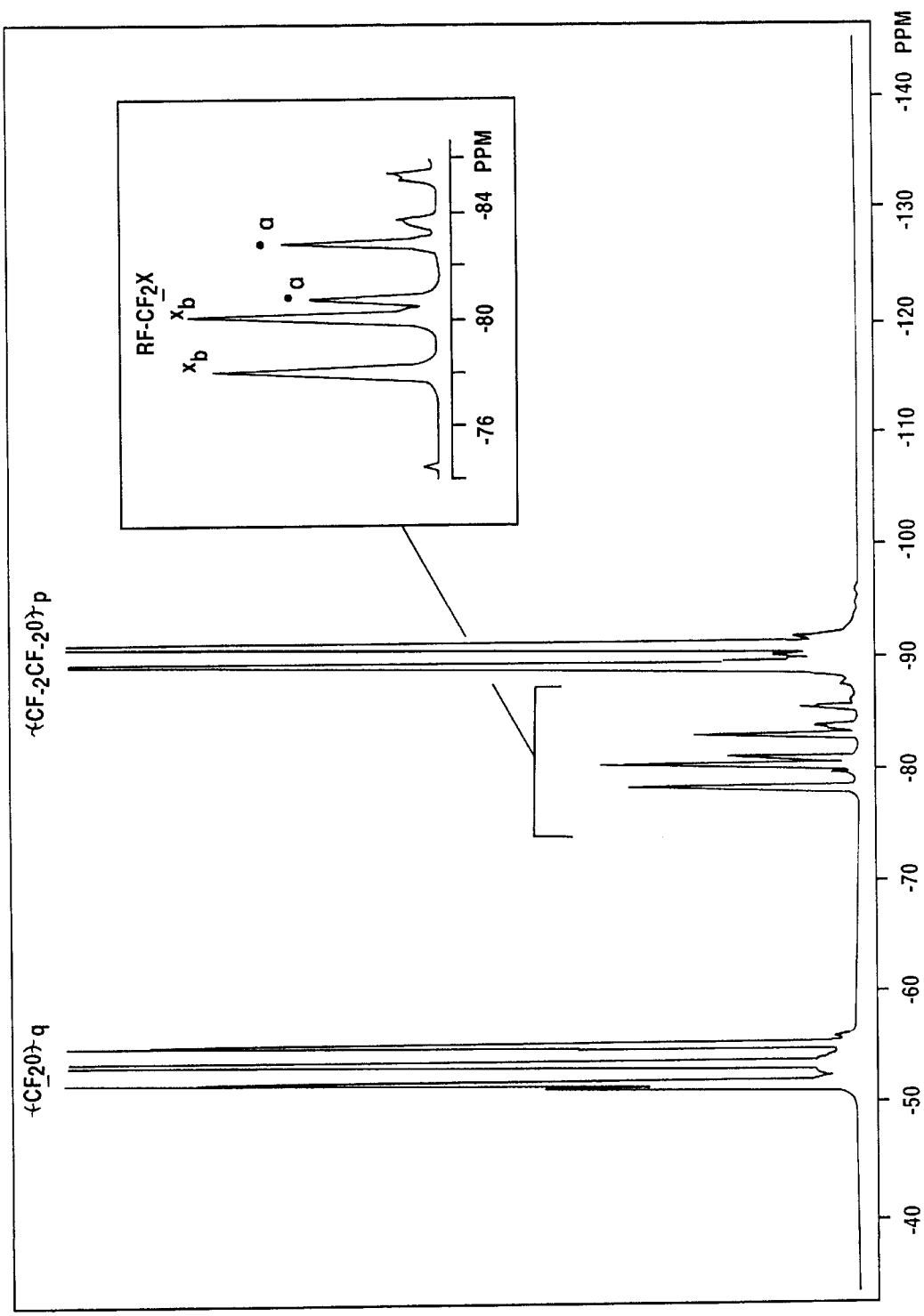
FIG. 8 is a spectra of the decomposition compound.
Figure 9A:
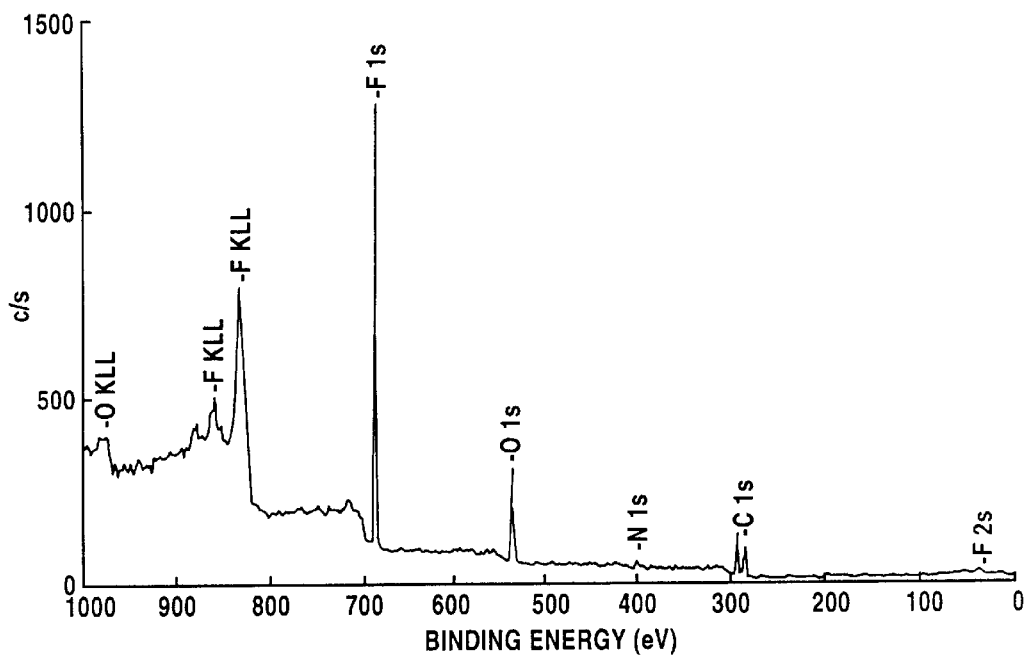
FIGS. 9a and 9b show the XPS spectra of the polymer of Example 3.
Figure 9B:
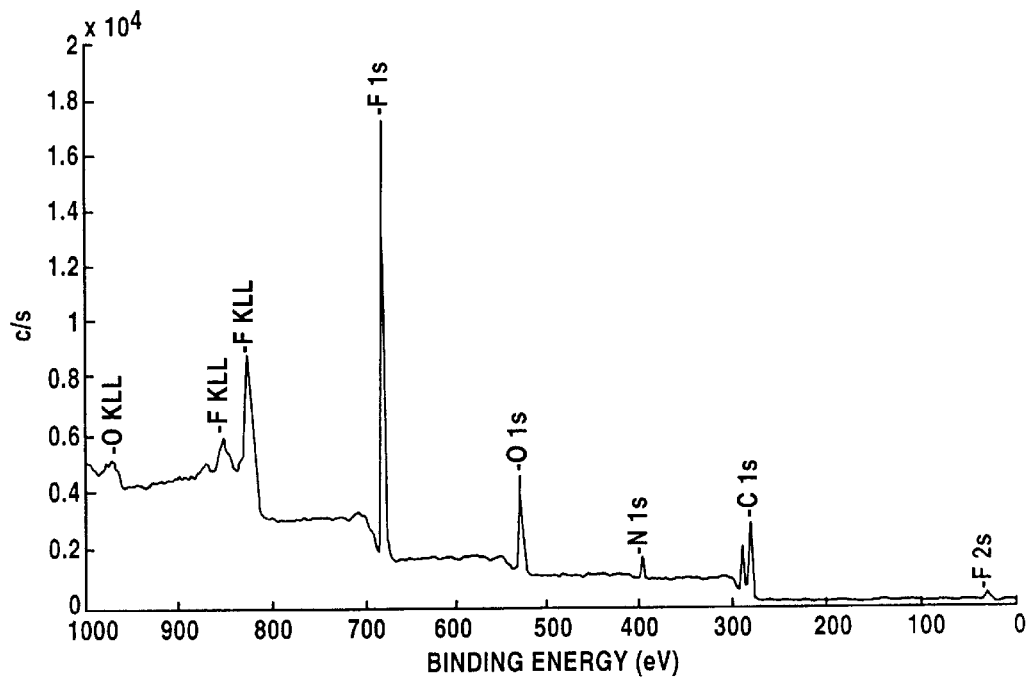
Figure 9C:
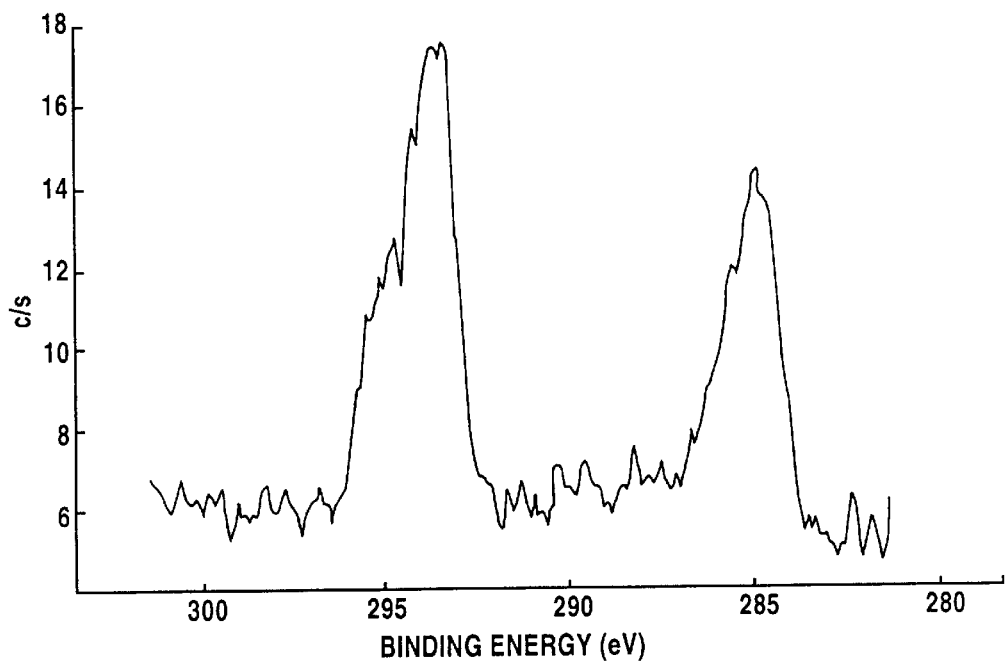
FIGS. 9c and 9d show the XPS spectra in the Cls region.
Figure 9D:
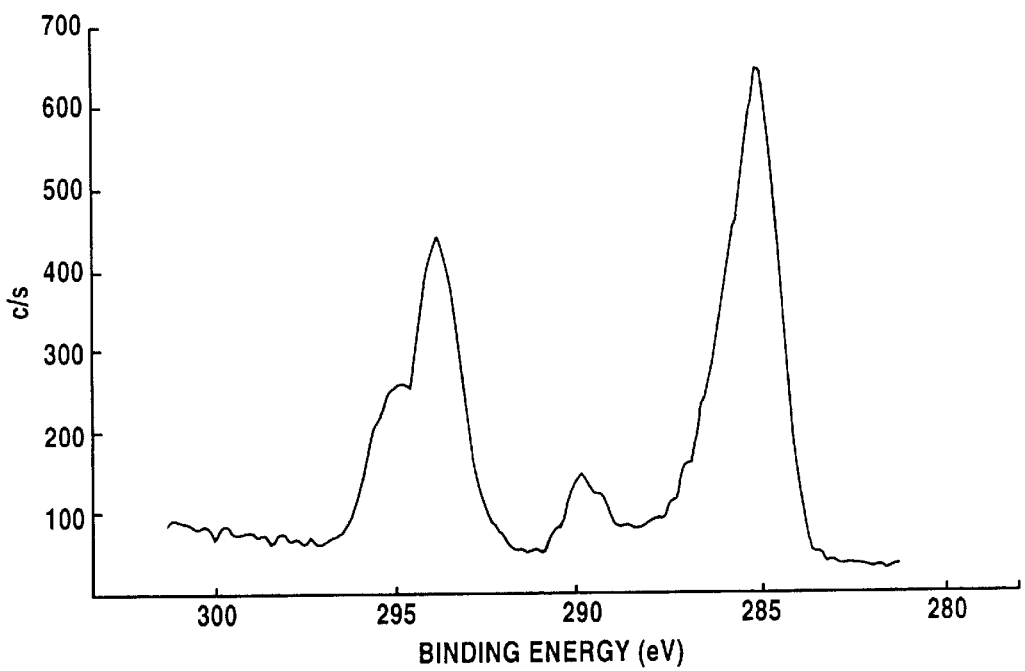
Figure 9E:
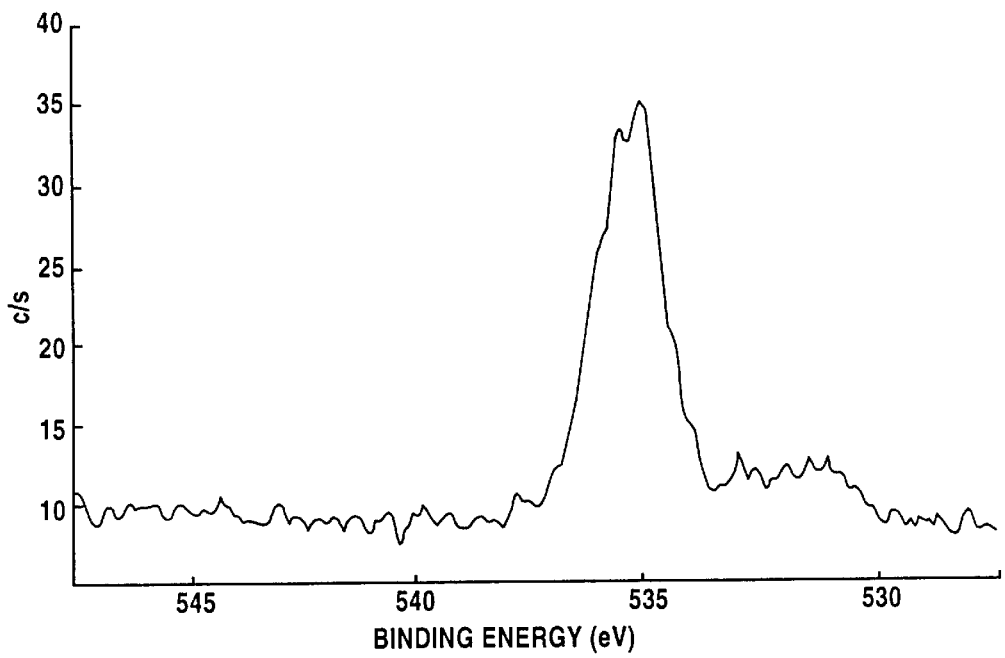
FIGS. 9e and 9f show the XPS spectra in the Ols region.
Figure 9F:
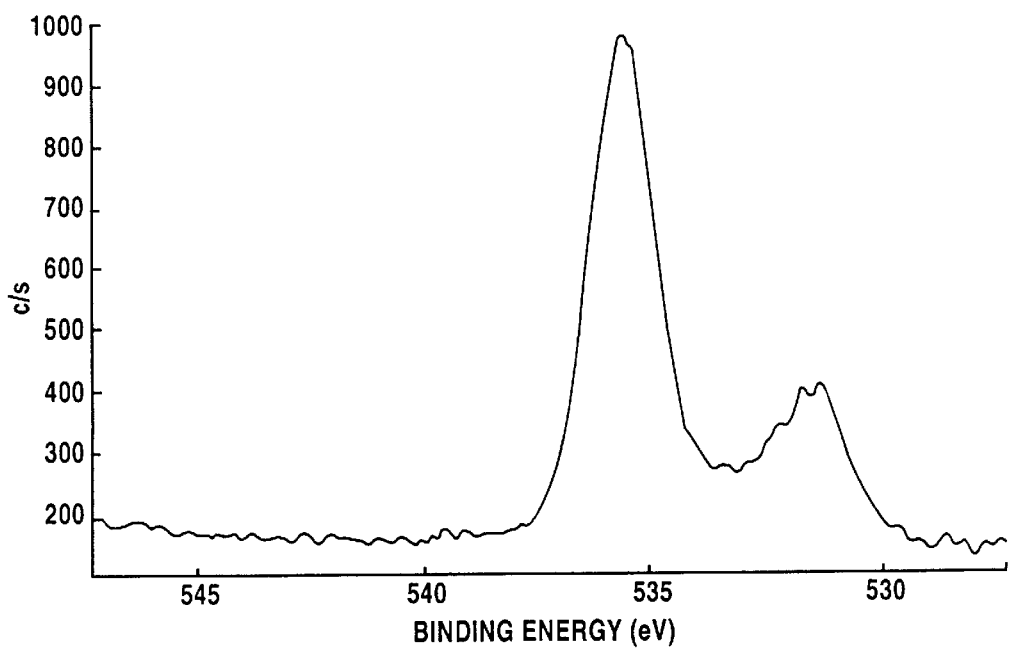

From this "white" test of hard degradation of the tetraol, it results that DOL is the only decomposition compound (see the spectra of FIG. 8). In the graph of FIG. 8, (a)= $R_fCF_2CH_2OH$ wherein $R_f$ is the perfluoropolyethereal chain, (b)=$R_fCH_2CH_2O$ wherein R is the hydrogenated part.

EXAMPLE 15

In FIGS. 9(a–b) the XPS spectra of the polymeric film of Ex. 3 of the present invention are reported.

In particular in FIG. 9 it is reported the XPS spectra (A: 10° take-off angle, B: 90° take-off angle, corresponding to sampling depths of about 1–2 nm and 7–10 nm respectively).

Relative abundance of Nitrogen: A=2.4%, B=4.1%, theoretical (bulk)=4.1%;

Relative abundance of Carbon: A=29.9%, B=40%, theoretical (bulk)=43.9%;

Relative abundance of Fluorine: A=49%, B=39.5%, theoretical (bulk)=35.1%;

Relative abundance of Oxygen: A=18.1%, B=16.3%, theoretical (bulk)=16.9%.

In FIGS. 9(c–d) are reported the XPS spectra in the C1s region (A and B spectra have the meaning indicated in FIG. 9).

the high energy signals at 294-293 eV are due to the perfluoroether chain. The variation of intensity ratios between signals observed (fluorine-non fluorine) further moves the surface composition towards the fluorinated component, beyond what is already apparent from survey spectra.

In FIGS. 9(e–f) it is reported the XPS spectra in the O1s region (A and B spectra have the meaning indicated in FIG. 9).

the high energy signal at 535.5 eV is due to the perfluoroether chain. The variation of intensity ratios between signals observed (fluorine-non fluorine) further moves the surface composition towards the fluorinated component, beyond what is already apparent from survey spectra.

EXAMPLE 16

Figure 10:
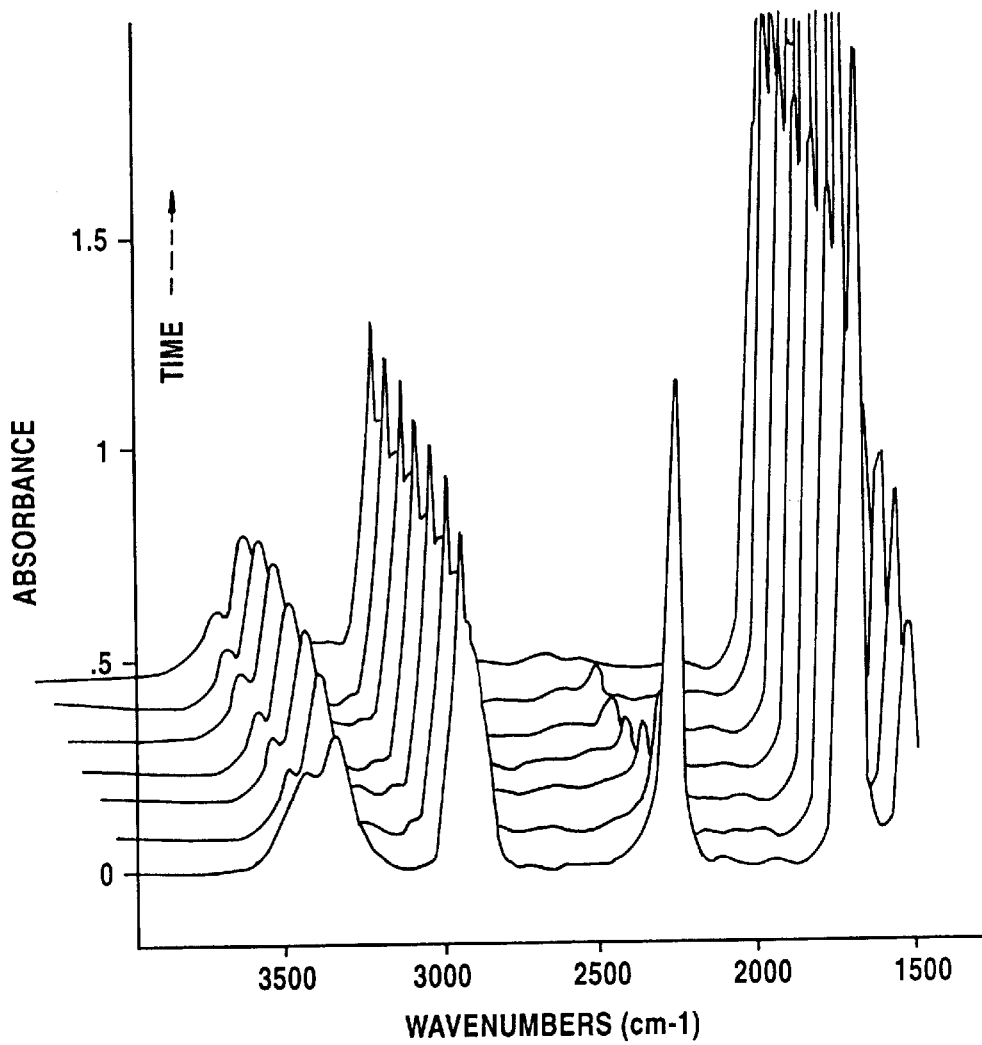
FIG. 10 shows the complete ir spectra of the film.

In FIG. 10 the IR spectrum of the film is reported in its entirety.

The IR spectra recorded during the reaction ZDOL-isocyanate of example 1, after the blocking of the crosslinker. We observe the disappearing of the band at 2270 $cm^{-1}$, due to the asymmetric stretching of N=C=O group. In the meantime, we observe the formation of urethane groups, whose characteristic bands are observed at 1720 $cm^{-1}$ and 1545 $cm^{-1}$. In the NH stretching region there is a broad and complex absorption at about 3355 $cm^{-1}$.

EXAMPLE 17

The pigmented film of example 2 was aged for 600 hours in OUV-B device and its stain release properties were evaluated according to the method described in example 11. The pigmented film fully maintained excellent anti dirt pick-up properties.

What is claimed is:

1. A process for coating coils with crosslinkable compositions comprising blocked isocyanates and (per) fluoropolyetheral polymers having an average number molecular weight of between 500 and 5000 and hydroxyl bifunctional termination and having improved stain release properties, no dirt pick-up and resistance to pressure marking and to hostile environments, said (per)fluoropolyetheral polymers comprising repeating units selected from the group consisting of:

a) —$(C_3F_6O)_{m'}(CFYO)_{n'}$— wherein the unit $(C_3F_6O)$ and (CFYO) are perfluorooxyalkylenic units statistically distributed along the chain; m' and n' are integers such as to give the molecular weight indicated above, and the ratio m'/n' between 5 and 40, when n' is different from 0; Y is equal to F or $CF_3$; n' can also be 0; said units can be linked to each other by a bridge bond —O—R'$_f$—O—, wherein R'$_f$ has the meaning defined in c) hereunder;

b) —$(C_2F_4O)_{p'}(CFYO)_{q'}(C_3F_6O)_{r'}$— wherein p' and q' are integers such that p'/q' ranges between 5 and 0.3, and such that the molecular weight is that indicated above; t' being an integer with the meaning of m', Y=F or CF$_3$; t' can be 0 and q'/q'+p'+t' lower than or equal to 1/10 and the t'/p' ratio is from 0.2 to 6;

c) —CR$_4$R$_5$CF$_2$CF$_2$O— wherein R$_4$ and R$_5$ are equal to or different from each other and chosen from H, Cl, F or perfluoroalkyl 1–4 C atoms, the molecular weight being that indicated above, said unit inside the fluoropolyoxyalkylenic chain being linked to each other as follows:

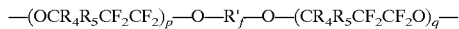
—(OCR$_4$R$_5$CF$_2$CF$_2$)$_p$—O—R'$_f$—O—(CR$_4$R$_5$CF$_2$CF$_2$O)$_q$— wherein R'$_f$ is a fluoroalkylenic group from 1 to 4 C, and p+q is at least 1 and such that the molecular weight is that indicated above, d) —(CF(CF$_3$)CF$_2$O— said units being linked each other inside the fluoropolyoxyalkylenic chain as follows:

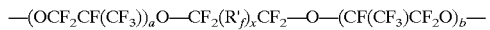
—(OCF$_2$CF(CF$_3$))$_a$O—CF$_2$(R'$_f$)$_x$CF$_2$—O—(CF(CF$_3$)CF$_2$O)$_b$— wherein R'$_f$ has the meaning indicated above, x is 0 or 1, a and b are integers and a+b is at least 1 and such that the molecular weight is that indicated above, and e) —(C$_2$F$_4$O)$_{a'}$(CFYO)$_{b'}$— wherein a' and b' are integers such that the molecular weight is within the range indicated, a'/b' ranges between 5 and 0.3, Y has the meaning indicated above, having hydroxyl bifunctional termination;

said process comprising coating coils with said composition, and crosslinking said polymers, said crosslinking being carried out with the blocked isocyanates having at least three NCO groups.

2. The process according to claim 1 wherein the number average molecular weight of the (per)fluoropolyethers is between 700 and 1500.

3. The process according to claim 1 wherein the (per)fluoropolyethers have the formula (I)

HO—(CH$_2$CH$_2$O)$_z$—CH$_2$CF$_2$O(C$_2$F$_4$O)$_{a'}$—(CF$_2$O)$_{b'}$CF$_2$—CH$_2$(OCH$_2$CH$_2$)$_z$—OH wherein z' is between 0 and 20.

4. The process according to claim 3, wherein z' is equal to 0.

5. The process according to claim 1 wherein the (per)fluoropolyethers having a hydroxylic bifunctional termination are substituted up to 20% by weight by perfluorocarbons containing units selected from —(CF$_2$CF$_2$)— or CF$_2$CFX wherein X is a perfluoroalkyl from 1 to 4 carbon atoms or OR'$_f$ wherein R'$_f$ is a perfluoroalkyl from 1 to 4 carbon atoms.

6. The process according to claim 1, wherein the crosslinking agents belonging to the class of the blocked polyisocyanates are blocked with ketoximes.

7. The process according to claim 6, wherein the crosslinking agents are polyisocyanates containing isocyanate rings.

8. The process according to claim 1, wherein the crosslinking agents are added to the perfluoropolyethereal polymers by utilizing diluting solvents having the general formula CH$_3$COOR$_2'$ with R$_2'$ linear or branched alkylic radical containing from 2 to 6 carbon atoms, ketones of general formula R$_3'$COR$_4'$ with R$_3'$ and R$_4'$ linear or branched alkylic radicals containing from 1 to 5 carbon atoms; aromatics and cycloaliphatics.

9. The process according to claim 1 wherein the ratio between crosslinking agent and fluoropolyetheral resin with bifunctional hydroxylic terminals is such that the ratio in equivalents NCO/OH is between 1/1 and 1.5/1.

10. The process according to claim 9 wherein the ratio between crosslinking agent and fluoropolyetheral resin with bifunctional hydroxylic terminals is such that the ratio in equivalents NCO/OH is between 1.05/1 and 1.25/1.

11. The process according to claim 1 wherein melaminic resins are employed in admixture with the crosslinking agents belonging to the class of blocked polyisocyantes blocked with ketoxime.

12. The process according to claim 11 wherein solvents can be utilized to obtain a concentration of final solid comprised between 75 and 85% by weight.

13. The process according to claim 1 wherein the crosslinked resin has a high elastic modulus and high yield point (>30 Mpa) combined with elongations at break in the range of 50%.

14. Crosslinked polymer coatings obtained according to the process of claim 1.

15. Coils obtained from the process of claim 1.

16. Articles obtained from coils according to claim 15.

17. The process according to claim 11 wherein the blocked isocyanates contain isocyanate rings.

* * * * *